United States Patent [19]
Bunn, Jr.

[11] Patent Number: 5,411,191
[45] Date of Patent: May 2, 1995

[54] RACK ASSEMBLY FOR PICKUP TRUCKS FOR DEVICES WITH HANDLES OF VARYING LENGTHS

[76] Inventor: Raymond Bunn, Jr., 6097 Stanley Ct., San Jose, Calif. 95123

[21] Appl. No.: 251,123

[22] Filed: May 31, 1994

[51] Int. Cl.6 .......................... B60R 11/06; A47F 5/13
[52] U.S. Cl. ............................ 224/42.45 R; 224/42.42; 211/70.6; 248/314
[58] Field of Search .................... 211/60.1, 65, 70.6; 224/42.42, 42.45 R, 249, 904; 280/727, 769, 762; 248/214, 231.4, 309.1, 314

[56] References Cited

U.S. PATENT DOCUMENTS

| | | | |
|---|---|---|---|
| D. 248,434 | 7/1978 | Clivio et al. | D6/125 |
| 2,587,226 | 7/1949 | Rodman | 211/60 |
| 3,273,846 | 9/1966 | De Mare | 248/314 |
| 4,286,717 | 9/1981 | Liesinger | 211/60 |
| 4,467,925 | 8/1984 | Ratzloff et al. | 211/60 T |
| 5,061,000 | 10/1991 | Haugen et al. | 296/3 |
| 5,076,479 | 12/1991 | Davison | 224/324 |
| 5,143,228 | 9/1992 | Arnold | 211/70.6 |

Primary Examiner—Henry J. Recla
Assistant Examiner—Peter S. Hrycko

[57] ABSTRACT

A rack assembly for pickup trucks for devices with handles of varying lengths comprising of a bracket assembly formed of an inverted L-shaped number with a vertical portion and a horizontal portion, the bracket having a plurality of apertures through the vertical portion; a plurality of hollow cylindrical members secured in a vertical orientation parallel with each other adjacent to the exterior edge of the horizontal component of the L-shaped members, each of the cylindrical members having an open upper and lower end; and a cup shaped member having an open upper end and a closed lower end with an interior diameter to fit over the exterior diameter of the lower extent of each cylindrical member, the cup shaped members adapted to overlay the lower extent of the cylindrical members to a predetermined extent, a horizontal radially disposed threaded aperture extending through an upper extent of each cup shaped member.

4 Claims, 4 Drawing Sheets

RACK ASSEMBLY FOR PICKUP TRUCKS FOR DEVICES WITH HANDLES OF VARYING LENGTHS

BACKGROUND OF THE INVENTION

1. Field of the Invention

The present invention relates to rack assembly for pickup trucks for devices with handles of varying lengths and more particularly pertains to supporting tools with handles of varying lengths in a rack removable positionable in a truck.

2. Description of the Prior Art

The use of racks for supporting tools and racks positionable in trucks is known in the prior art. More specifically, racks for supporting tools and racks positionable in trucks heretofore devised and utilized for the purpose of supporting tools or other devices in trucks or the like are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,143,228 to Arnold a garden equipment support rack.

U.S. Pat. No. 5,076,479 to Davison discloses a cargo rack.

U.S. Pat. No. 5,061,000 to Haugen discloses a rack for pickup truck.

U.S. Pat. No. 4,467,925 to Ratzloff a wheelbarrow and garden tool storage rack.

U.S. Pat. No. Des. 248,434 to Clivio the design of a hanger for garden utensils.

In this respect, the rack assembly for pickup trucks for devices with handles of varying lengths according to the present invention substantially departs from the conventional concepts and designs of the prior art, and in doing so provides an apparatus primarily developed for the purpose of supporting tools with handles of varying lengths in a rack removable positionable in a truck.

Therefore, it can be appreciated that there exists a continuing need for new and improved rack assembly for pickup trucks for devices with handles of varying lengths which can be used for supporting tools with handles of varying lengths in a rack removable positionable in a truck. In this regard, the present invention substantially fulfills this need.

SUMMARY OF THE INVENTION

In view of the foregoing disadvantages inherent in the known types of racks for supporting tools and racks positionable in trucks now present in the prior art, the present invention provides an improved rack assembly for pickup trucks for devices with handles of varying lengths. As such, the general purpose of the present invention, which will be described subsequently in greater detail, is to provide a new and improved rack assembly for pickup trucks for devices with handles of varying lengths and method which has all the advantages of the prior art and none of the disadvantages.

To attain this, the present invention essentially comprises of a bracket assembly formed of a first inverted L-shaped member and a second inverted L-shaped member each with a vertical portion and a horizontal portion, each bracket having a pair of tubular members secured in a horizontal orientation to the upper surface of the horizontal portions of the bracket and coupling bolts with associated nuts extending through the tubular members for securing the tubular members with respect to each other and the vertical portions of the bracket in space parallel relationship on opposite sides of a wall of a truck to which the assembly is to be mounted, the interior surfaces of the L-shape members being provided with an elastomeric surface to preclude scratching of the truck contacted by the bracket; a plurality of hollow cylindrical members secured in a vertical orientation parallel with each other along the exterior vertical surface of one of the L-shaped members, each of the cylindrical members having an open upper and lower end to allow the passage of the handle of a tool therethrough; a cup shaped member having an open upper end and a closed lower end with an interior diameter to fit over the exterior diameter of the lower extent of each cylindrical member, the cup shaped members adapted to overlay the lower extents of the cylindrical members to a predetermined extent, a horizontal radially disposed threaded aperture extending through an upper extent of each cup shaped member; and a locking bolt having a threaded interior end threadedly positionable within the threaded aperture of the cup shaped member and having at its exterior end a knurled head adapted to be rotated by the user whereby when rotated in one direction the interior end of the bolt will move in the aperture away from the cylindrical member but when rotated in the opposite direction the free end will move into frictional locking contact with the exterior adjacent surface of the cylindrical member to lock the cup shaped member at a predetermined axial orientation with respect to the cylindrical member to accommodate the handle of a tool of a predetermined length.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved rack assembly for pickup trucks for devices with handles of varying lengths which have all the advantages of the prior art racks for supporting tools and racks positionable in trucks and none of the disadvantages.

It is another object of the present invention to provide new and improved rack assembly for pickup trucks for devices with handles of varying lengths which may be easily and efficiently manufactured and marketed.

It is further object of the present invention to provide new and improved rack assembly for pickup trucks for devices with handles of varying lengths which are of durable and reliable constructions.

An even further object of the present invention is to provide new and improved rack assembly for pickup trucks for devices with handles of varying lengths which are susceptible of a low cost of manufacture with regard to both materials and labor, and which accordingly are then susceptible of low prices of sale to the consuming public, thereby making such rack assembly for pickup trucks for devices with handles of varying lengths economically available to the buying public.

Still yet another object of the present invention is to provide new and improved rack assembly for pickup trucks for devices with handles of varying lengths which provide in the apparatuses and methods of the prior art some of the advantages thereof, while simultaneously overcoming some of the disadvantages normally associated therewith.

Still another object of the present invention is to supporting tools with handles of varying lengths in a rack removable positionable in a truck.

Lastly, it is an object of the present invention to provide new and improved rack assembly for pickup trucks for devices with handles of varying lengths comprising of a bracket assembly formed of an inverted L-shaped member with a vertical portion and a horizontal portion, the bracket having a plurality of apertures through the vertical portion; a plurality of hollow cylindrical members secured in a vertical orientation parallel with each other adjacent to the exterior edge of the horizontal component of the L-shaped members, each of the cylindrical members having an open upper and lower end; and a cup shaped member having an open upper end and a closed lower end with an interior diameter to fit over the exterior diameter of the lower extent of each cylindrical member, the cup shaped members adapted to overlay the lower extent of the cylindrical members to a predetermined extent, a horizontal radially disposed threaded aperture extending through an upper extent of each cup shaped member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. dr

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
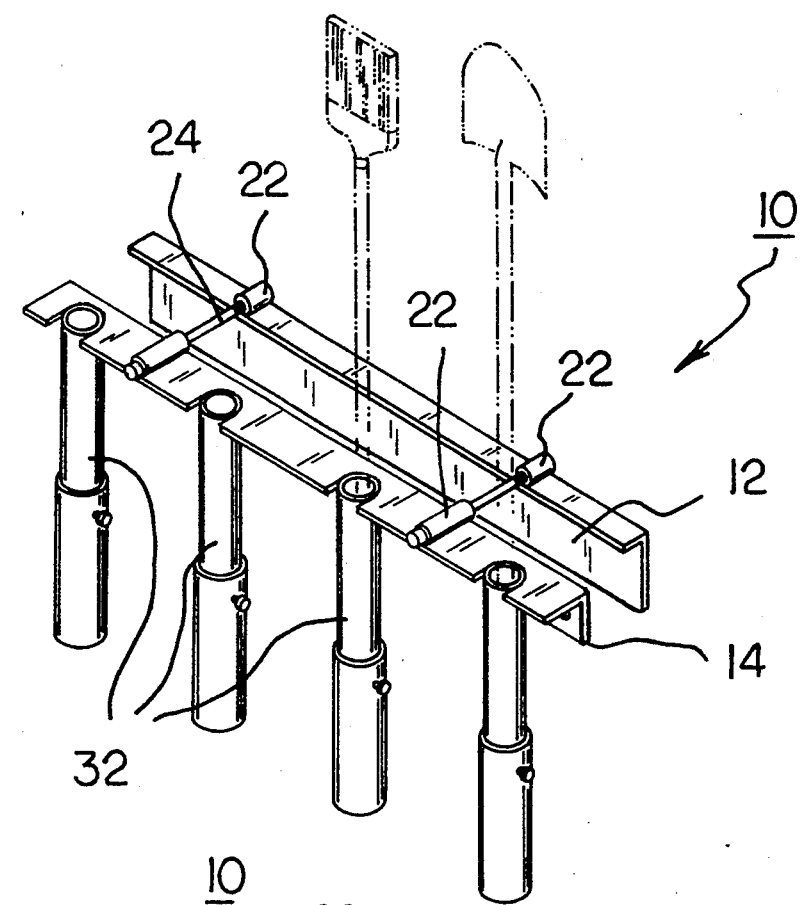
FIG. 1 is a perspective illustration of the preferred embodiment of the new and improved rack assembly for pickup trucks for devices with handles of varying lengths constructed in accordance with the principles of the present invention.
Figure 2:
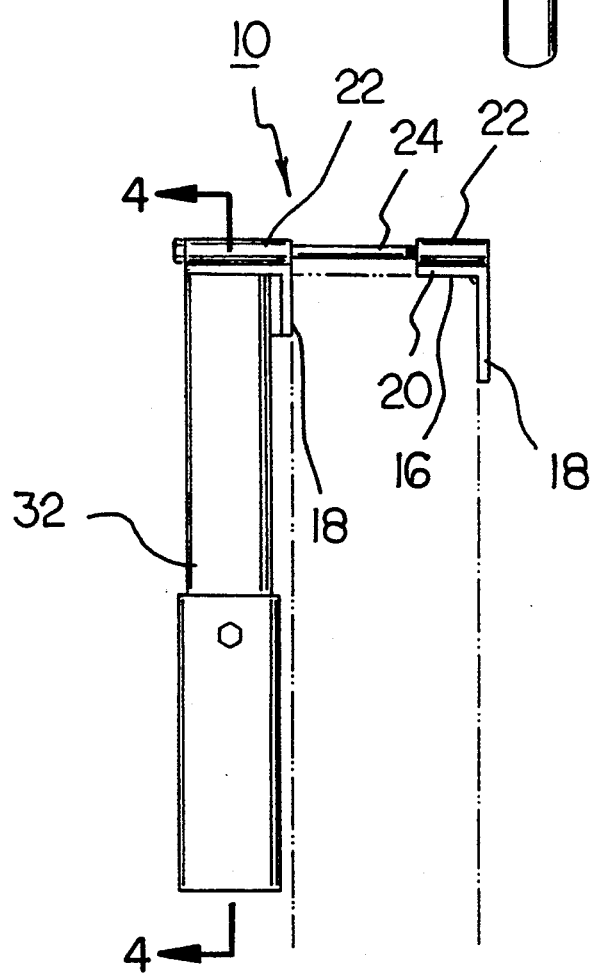
FIG. 2 is a side elevational view of the rack shown in FIG. 1.
Figure 3:
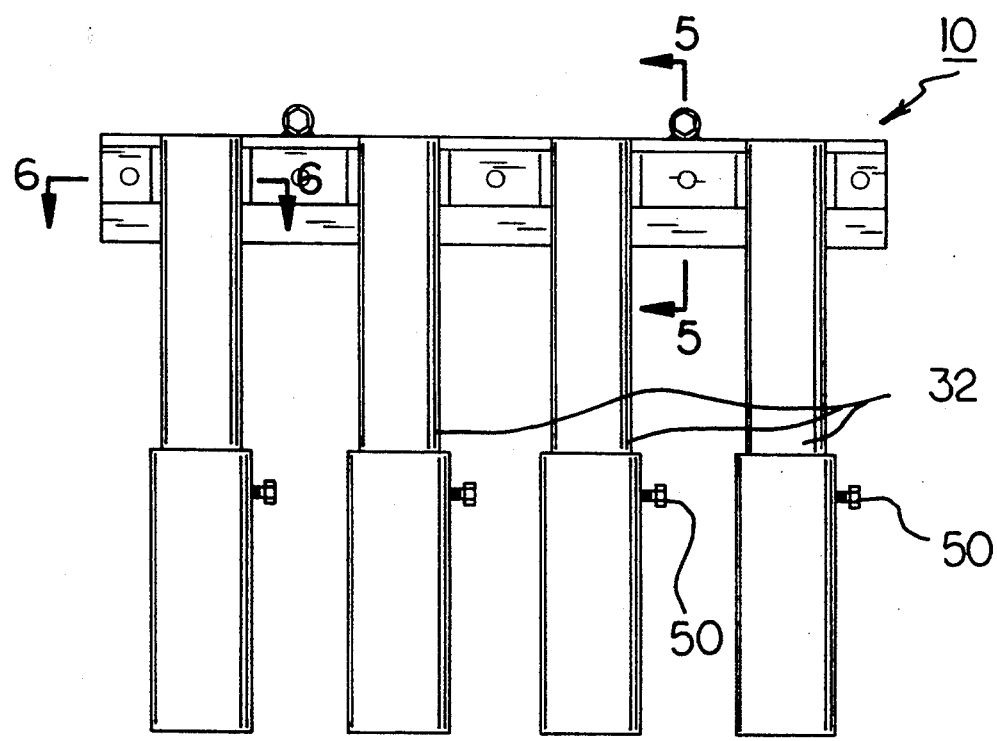
FIG. 3 is a front elevational view of the rack shown in the prior figure.
Figure 4:
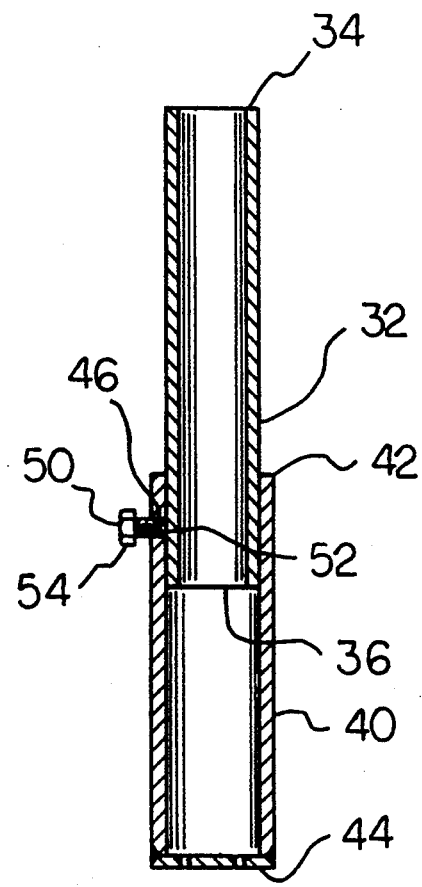
FIG. 4 is a cross-sectional view of one of the supports of the rack of the prior figures taken along line 4—4 of FIG. 2.
Figure 5:
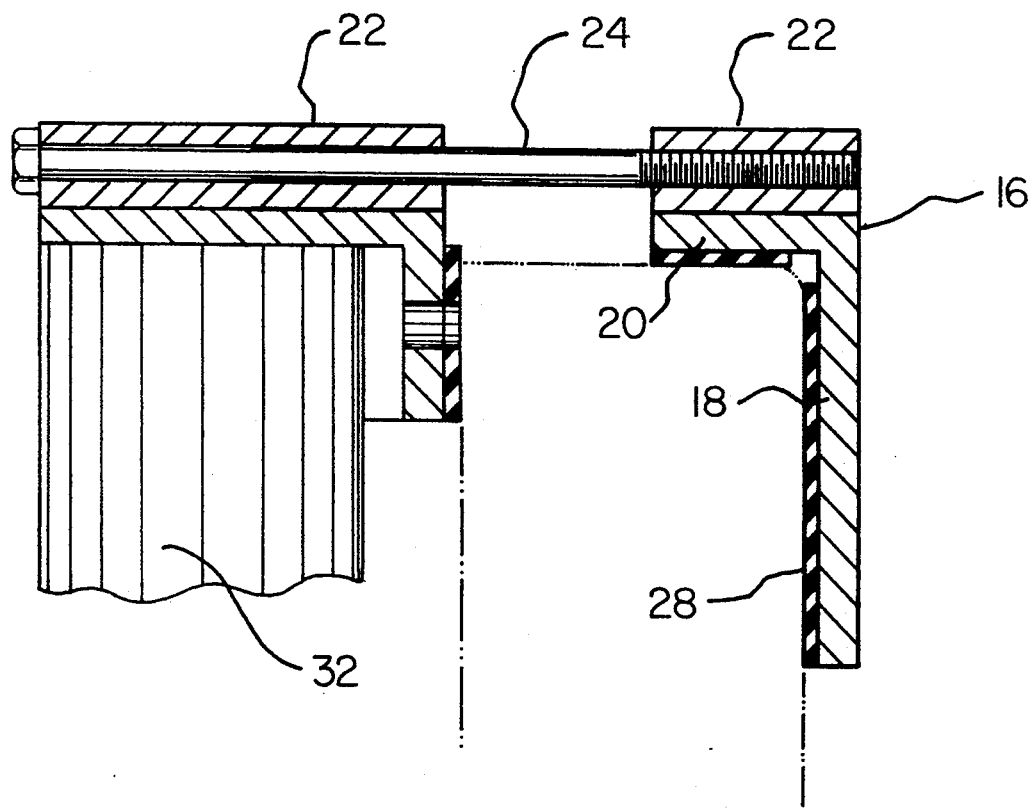
FIG. 5 is a cross-sectional view taken along line 5—5 of FIG. 3.
Figure 6:
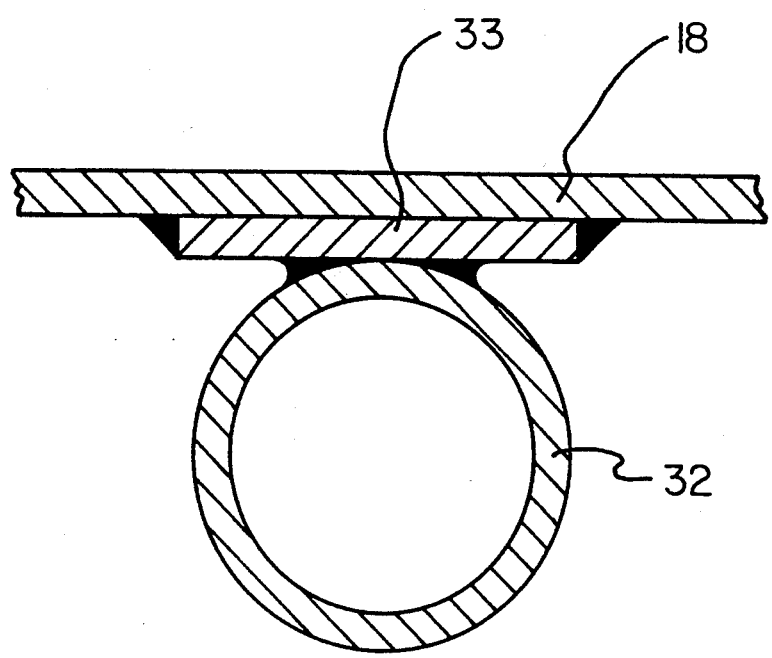
FIG. 6 is a cross-sectional view taken along line 6—6 of FIG. 3.

With reference now to the drawings, and in particular to FIG. 1 thereof, the preferred embodiment of the new and improved rack assembly for pickup trucks for devices with handles of varying lengths embodying the principles and concepts of the present invention and generally designated by the reference numeral 10 will be described.

The present invention the new and improved rack assembly for pickup trucks for devices with handles of varying lengths is comprised of a plurality of component elements. In their broadest context, such elements; include a bracket, a plurality of hollow cylindrical members, cup shaped members, and locking bolts. Such component elements are specifically configured and correlated with respect to each other so as to attain the desired objectives.

More specifically, the rack assembly 10 includes a bracket 12 formed of a first inverted L-shaped member 14 and a second inverted L-shaped member 16. Each of such L-shaped members has a vertical portion 18 and a horizontal portion 20. In addition, each bracket has a pair of tubular members 22 secured in a horizontal orientation to the upper surface of the horizontal portions of the brackets. In addition, coupling bolts 24 extend through the tubular members for securing such tubular members to each other along with the vertical portions of the brackets whereby they are in space parallel relationship on opposite sides of a wall of a truck to which the assembly is to be mounted. The interior surfaces of the L-shaped members are preferably provided with an elastomeric surface 28 to preclude scratching the truck contacted by the brackets.

Next provided are a plurality of hollow cylindrical members 32. Such members are secured as by welding in a vertical orientation parallel with each other adjacent to the exterior vertical surface of one of the L-shaped members 18 through an intermediate plate 33. Each of the cylindrical members has an open upper end 34 and an open lower end 36. This allows the passage of the handle of the tool therethrough. In such manner, the tool is readily removable from the cylindrical members.

In association with each hollow cylindrical member is a cup shaped member 40. Each cup shaped member has an open upper end 42 and a closed lower end 44. The interior diameter of the cup shape member is such as to fit over the exterior diameter of its associated cylindrical member at its lower extent. Each cup shaped member is adapted to overlay the lower extent of its associated cylindrical member to a predetermined axial extent. In addition, a horizontal, radially disposed aperture 46 is provided with threads and extends through an upper extent of each cup shape member.

The last component of the system is a locking bolt 50. A similar locking bolt is provided for each cup shape member and associated cylindrical member. Each locking bolt 50 has a threaded interior end 52. Such end is threadedly positionable within the threaded aperture of the cup shape member. Each locking bolt also has an exterior end with a head 54. Such head is adapted to be rotated by the user. When rotated in one direction, the interior end of the bolt will move in the aperture away from the cylindrical member. When rotated in the opposite direction, the free end will move into frictional locking contact with the exterior adjacent surface of the cylindrical member. This will function to lock the cup shaped member at a predetermined axial orientation with respect to the cylindrical member. This allows each cylindrical member and associated cup shape member to accommodate the handle of a tool of a predetermined length, independent of the positioning of the other cup shaped members.

Figure 7:
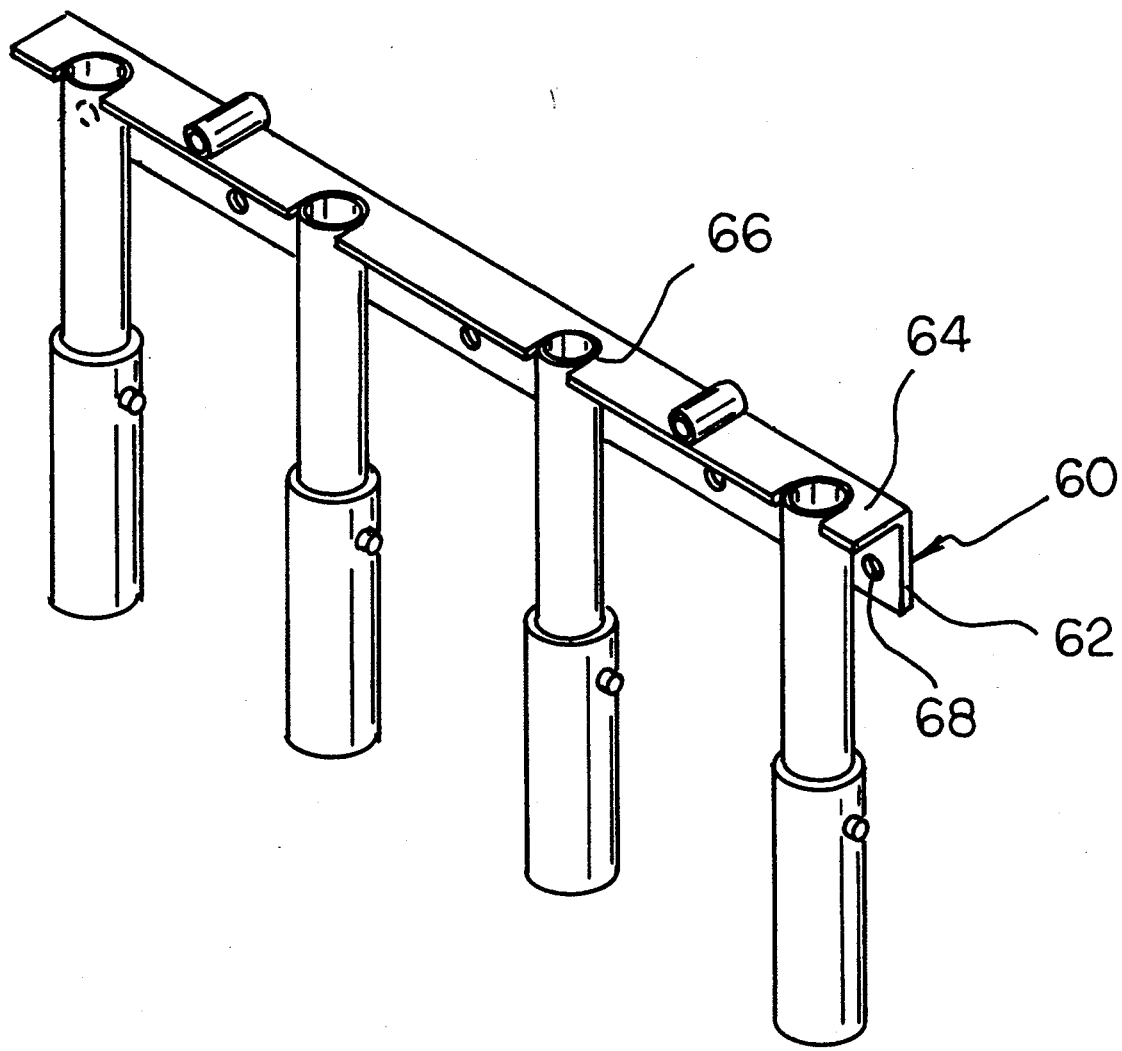
FIG. 7 is a perspective illustration of an alternate embodiment of the invention. The same reference numerals refer to the same parts through the various figures.

Shown in FIG. 7 is an alternate embodiment of the invention. In accordance with the alternate embodiment, a variation is provided to the inverted L-shaped member 60. Such member has a vertical planar component 62 coupled with a horizontal planar component 64. The vertical component extends outwardly away from the surface to which the member 60 is to be coupled. Such structural features are also present in the embodiment of the prior figure. In the FIG. 7 embodiment, however, the vertical component 62 is provided with apertures 68 for being screwed directly to an interior wall of the truck with which it is to be utilized. This FIG. 7 embodiment is the preferred embodiment except where ready removability is desired.

Formed into the free edge of the horizontal component 64 are a plurality of semicircular recesses 66. Such semicircular recesses are of a diameter to receive the hollow cylindrical members and cup shaped members similar to those of the primary embodiment. Coupling therebetween is at the interior of the recess with the upper interior edge of the cylindrical members. In this manner, the L-shaped member 60 may be screwed directly to a recipient surface such as of truck through the utilization of screws through mounting holes or apertures 68. The tubular members are still preferably secured in a horizontal orientation to the upper surface of the horizontal portions of the L-shaped member if, for some reason, coupling through screws is not desired.

This invention was designed to fit over the front wall of a pickup truck bed. Its purpose is to carry rakes, shovels, brooms or the like. Many of the newer trucks as well as a few older model trucks do not have the square holes designed into the top of truck bed walls. They are designed instead with rails running through the bottom of the truck leaving no accessible or convenient place to carry items such as rakes, shovels, brooms or the like. The present invention gives a person who carries such items a convenient place for storing these items.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved rack assembly for pickup trucks for devices with handles of varying lengths comprising, in combination;
 a bracket assembly formed of a first inverted L-shaped member and a second inverted L-shaped member each with a vertical portion and a horizontal portion, each bracket having a pair of tubular members secured in a horizontal orientation to the upper surface of the horizontal portions of the bracket and coupling bolts with associated nuts extending through the tubular members for securing the tubular members with respect to each other and the vertical portions of the bracket in space parallel relationship on opposite sides of a wall of a truck to which the assembly is to be mounted, the interior surfaces of the L-shape members being provided with an elastomeric surface to preclude scratching of the truck contacted by the bracket;
 a plurality of hollow cylindrical members secured in a vertical orientation parallel with each other along the exterior vertical surface of one of the L-shaped members, each of the cylindrical members having an open upper and lower end to allow the passage of the handle of a tool therethrough;
 a cup shaped member having an open upper end and a closed lower end with an interior diameter to fit over the exterior diameter of the lower extent of each cylindrical member, the cup shaped members adapted to overlay the lower extents of the cylindrical members to a predetermined extent, a horizontal radially disposed threaded aperture extending through an upper extent of each cup shaped member; and
 a locking bolt having a threaded interior end threadedly positionable within the threaded aperture of the cup shaped member and having at its exterior end a knurled head adapted to be rotated by the user whereby when rotated in one direction the interior end of the bolt will move in the aperture away from the cylindrical member but when rotated in the opposite direction the free end will move into frictional locking contact with the exterior adjacent surface of the cylindrical member to lock the cup shaped member at a predetermined axial orientation with respect to the cylindrical member to accommodate the handle of a tool of a predetermined length.

2. A rack assembly for pickup trucks for devices with handles of varying lengths comprising;

a bracket assembly formed of an inverted L-shaped member with a vertical portion and a horizontal portion, the bracket having a plurality of apertures through the vertical portion;

a plurality of hollow cylindrical members secured in a vertical orientation parallel with each other adjacent to the exterior edge of the horizontal component of the L-shaped members, each of the cylindrical members having an open upper and lower end; and a cup shaped member having an open upper end and a closed lower end with an interior diameter to fit over the exterior diameter of the lower extent of each cylindrical member, the cup shaped members adapted to overlay the lower extent of the cylindrical members to a predetermined extent, a horizontal radially disposed threaded aperture extending through an upper extent of each cup shaped member.

3. The assembly as set forth in claim 2 and further including:

a locking bolt having a threaded interior end threadedly positionable within the threaded aperture of the cup shaped member and having at its exterior end a knurled head adapted to be rotated by the user whereby when rotated in one direction the interior end of the bolt will move in the aperture away from the cylindrical member but when rotated in the opposite direction the free end will move into frictional locking contact with the exterior adjacent surface of the cylindrical member to lock the cup shaped member at a predetermined axial orientation with respect to the cylindrical member.

4. The assembly as set forth in claim 2 wherein the horizontal portion of the L-shaped bracket is provided with semicircular recesses for the receipt of the upper edges of the hollow cylindrical member.

* * * * *